(12) United States Patent
Drake et al.

(10) Patent No.: US 9,224,358 B2
(45) Date of Patent: Dec. 29, 2015

(54) PROXIMITY-BASED MULTI-DISPLAY CONFIGURATION

(71) Applicant: Disney Enterprises, Inc., Burbank, CA (US)

(72) Inventors: Edward Drake, Stevenson Ranch, CA (US); Mark Arana, West Hills, CA (US); Evan Acosta, La Crescenta, CA (US)

(73) Assignee: Disney Enterprises, Inc., Burbank, CA (US)

( * ) Notice: Subject to any disclaimer, the term of this patent is extended or adjusted under 35 U.S.C. 154(b) by 105 days.

(21) Appl. No.: 14/012,756

(22) Filed: Aug. 28, 2013

(65) Prior Publication Data

US 2014/0232616 A1  Aug. 21, 2014

Related U.S. Application Data

(60) Provisional application No. 61/766,065, filed on Feb. 18, 2013.

(51) Int. Cl.
  *G09G 5/00* (2006.01)
  *G06T 13/80* (2011.01)
  *H04B 5/02* (2006.01)
  *G06Q 30/02* (2012.01)
  *G06Q 30/06* (2012.01)
  *G06Q 20/32* (2012.01)
  *G06Q 20/38* (2012.01)
  *G06Q 20/40* (2012.01)
  (Continued)

(52) U.S. Cl.
  CPC .............. *G09G 5/003* (2013.01); *G06F 3/1423* (2013.01); *G06F 3/1438* (2013.01); *G06Q 20/3226* (2013.01); *G06Q 20/3829* (2013.01); *G06Q 20/401* (2013.01); *G06Q 30/0261* (2013.01); *G06Q 30/0267* (2013.01); *G06Q 30/0623* (2013.01); *G06Q 30/0625* (2013.01); *G06T 13/80* (2013.01); *H04B 5/02* (2013.01); *G06F 3/0346* (2013.01); *G09G 2370/04* (2013.01); *G09G 2370/10* (2013.01); *G09G 2370/16* (2013.01)

(58) Field of Classification Search
  CPC ... G06F 3/1423; G06F 3/1438; G06F 3/0346; G09G 2356/00; G09G 2370/04; G09G 2370/10; G09G 2370/16; G09G 5/003; H04B 5/02; G06T 13/80
  USPC .............................. 345/1.1, 1.3, 156–173, 1.2
  See application file for complete search history.

(56) References Cited

U.S. PATENT DOCUMENTS

| | | | |
|---|---|---|---|
| 2005/0093868 A1* | 5/2005 | Hinckley | 345/502 |
| 2008/0211825 A1* | 9/2008 | Sunakawa et al. | 345/581 |
| 2009/0160731 A1* | 6/2009 | Schuler et al. | 345/1.1 |

(Continued)

OTHER PUBLICATIONS http://www.youtube.com/watch?v=f43NGb8XRK4, Feb. 19, 2012.

*Primary Examiner* — Hong Zhou
(74) *Attorney, Agent, or Firm* — Patent Ingenuity, P.C.; Samuel K. Simpson (57) ABSTRACT

A process is utilized to provide a multi-display configuration. The process detects, at a first proximity-based device within a first display device, a presence of a second proximity-based device within a second display device. The presence is within a proximity. Further, the process displays a first portion of a multi-display image at the first display device based upon a location of the first display device relative to the second display device.

16 Claims, 11 Drawing Sheets

(51) Int. Cl.
  *G06F 3/14*     (2006.01)
  *G06F 3/0346*   (2013.01)

(56) References Cited

U.S. PATENT DOCUMENTS

| | | | |
|---|---|---|---|
| 2010/0053164 A1* | 3/2010 | Imai et al. | 345/427 |
| 2010/0121921 A1* | 5/2010 | Dunton | 709/205 |
| 2010/0144283 A1* | 6/2010 | Curcio et al. | 455/66.1 |
| 2010/0315315 A1* | 12/2010 | Osborne | 345/1.3 |
| 2011/0025695 A1* | 2/2011 | Yoshida et al. | 345/501 |
| 2011/0065459 A1* | 3/2011 | Cheng et al. | 455/457 |
| 2012/0062442 A1* | 3/2012 | Locker et al. | 345/1.3 |
| 2012/0206319 A1* | 8/2012 | Lucero et al. | 345/1.3 |
| 2012/0242596 A1* | 9/2012 | Sip | 345/173 |
| 2012/0280898 A1* | 11/2012 | Lucero et al. | 345/156 |
| 2013/0050080 A1* | 2/2013 | Dahl et al. | 345/158 |
| 2013/0214995 A1* | 8/2013 | Lewin et al. | 345/1.3 |

* cited by examiner

PROXIMITY-BASED MULTI-DISPLAY CONFIGURATION

RELATED APPLICATIONS

This application claims priority to U.S. Provisional Patent Application Ser. No. 61/766,065, filed on Feb. 18, 2013, entitled TRANSFERENCE OF DATA TO PROVIDE CONTENT, which is hereby incorporated by reference in its entirety.

BACKGROUND

1. Field

This disclosure generally relates to the field of data transference.

2. General Background

With advances in technology, mobile devices, e.g., smartphones, tablet devices, and the like, provide users with the ability to view content that was previously viewed only on display devices with larger display screens, e.g., televisions, computer monitors, movie screens, and the like. As a result, users may now enjoy watching their favorite movies, television shows, and various other video or image content on their mobile devices instead of display devices with larger display screens. As many display devices with larger display screens are often stationary devices, users are not constrained to a particular location to watch video content on their mobile devices.

Although mobile devices provide users with the ability to move to various locations and still watch video and image content, the mobile devices are often limited by the size constraints of their corresponding display screens. As a result, users with mobile devices often have a limited viewing experience of video or image content on their mobile devices.

SUMMARY

A process is utilized to provide a multi-display configuration. The process detects, at a first proximity-based device within a first display device, a presence of a second proximity-based device within a second display device. The presence is within a proximity. Further, the process displays a first portion of a multi-display image at the first display device based upon a location of the first display device relative to the second display device.

An apparatus is also provided. The apparatus comprises a first proximity-based device and a first display device. The first proximity-based device is configured to detect a presence of a second proximity-based device within a second display device. The first display device is configured to display a first portion of a multi-display image based upon a location of the first display device relative to the second display device.

BRIEF DESCRIPTION OF THE DRAWINGS

The above-mentioned features of the present disclosure will become more apparent with reference to the following description and accompanying drawings, wherein like reference numerals denote like elements and in which.

DETAILED DESCRIPTION

A proximity-based multi-display configuration displays content by having each of a plurality of display devices display a portion of the respective content. For example, four smartphones may be placed together. Each smartphone may display a quarter of the overall image for a particular frame of video content. As a result, the proximity-based multi-display configuration of four smartphones displays video content on an overall display that is four times larger than that of each individual smartphone. Accordingly, a group of users may watch content on a larger display and still have the flexibility of moving from location to location with a mobile device.

Figure 1:
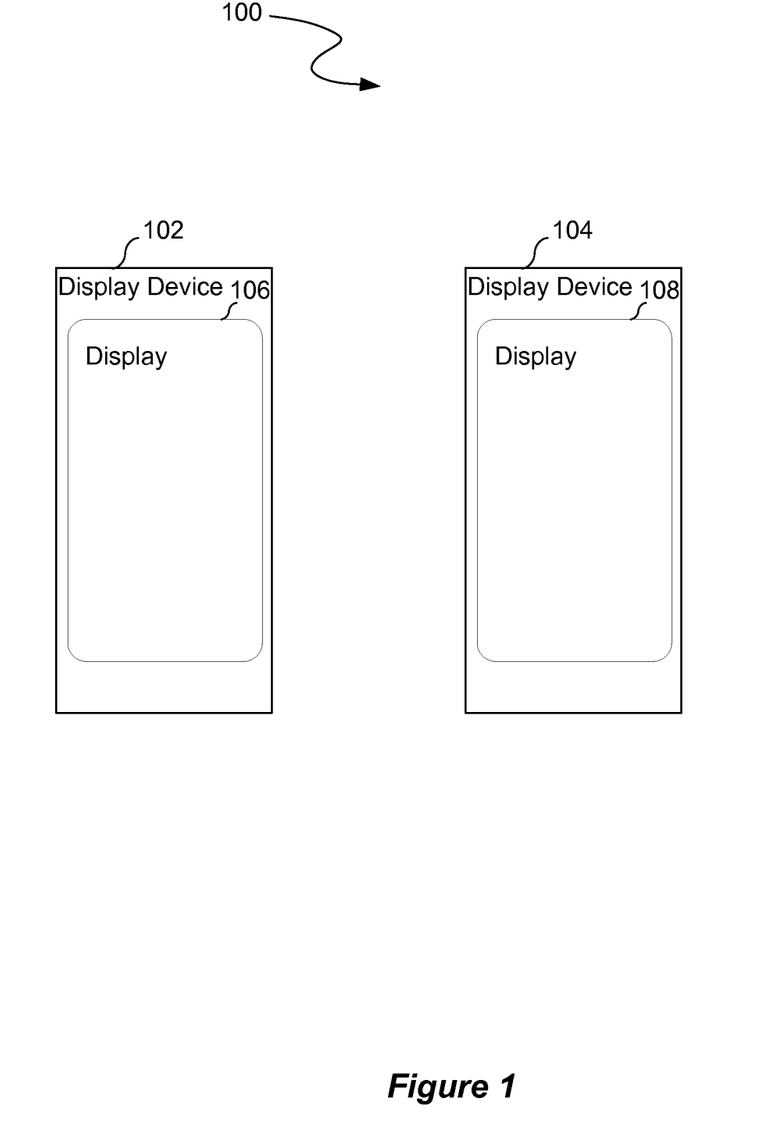
FIG. 1 illustrates a proximity-based multi-display configuration.

FIG. 1 illustrates a proximity-based multi-display configuration 100. The proximity-based multi-display configuration 100 includes a first display device 102 and a second display device 104. The first display device 102 includes a first display 106. Further, the second display device 104 includes a second display 108. Examples of display devices are mobile computing devices, monitors, and the like. A mobile computing device is a smartphone, tablet device, and the like.

The first display device 102 and the second display device 104 are brought within a proximity to each other. By being within the proximity to each other, the display devices 102 and 104 may establish communication with each other. Such communication lets each of the display devices 102 and 104 know the position of each other. As a result, each of the respective display devices is aware of what portion of a particular image to display. For example, each of the display devices 102 and 104 may receive the entirety of a particular frame of a video content. The first display device 102 may inform the second display device 104 that the first display device 102 is on the left side of the second display device 104. Further, the second display device 104 may inform the first display device 102 that the second display device 104 is on the right side of the first display device 102. As a result, the first display device 102 is aware that the first display device 102 should only display the left half of the frame of the video content, whereas the second display device 104 is aware that the second display device 104 should only display the right half of the frame of the video content.

The displays 106 and 108 may be displays that are integrated within the display devices 102 and 104, e.g., smartphone displays. Alternatively, the displays 106 and 108 may be displays that are operably connected to the display devices 102 and 104, e.g., an LED monitor, an LCD monitor, or the like.

Figure 2:
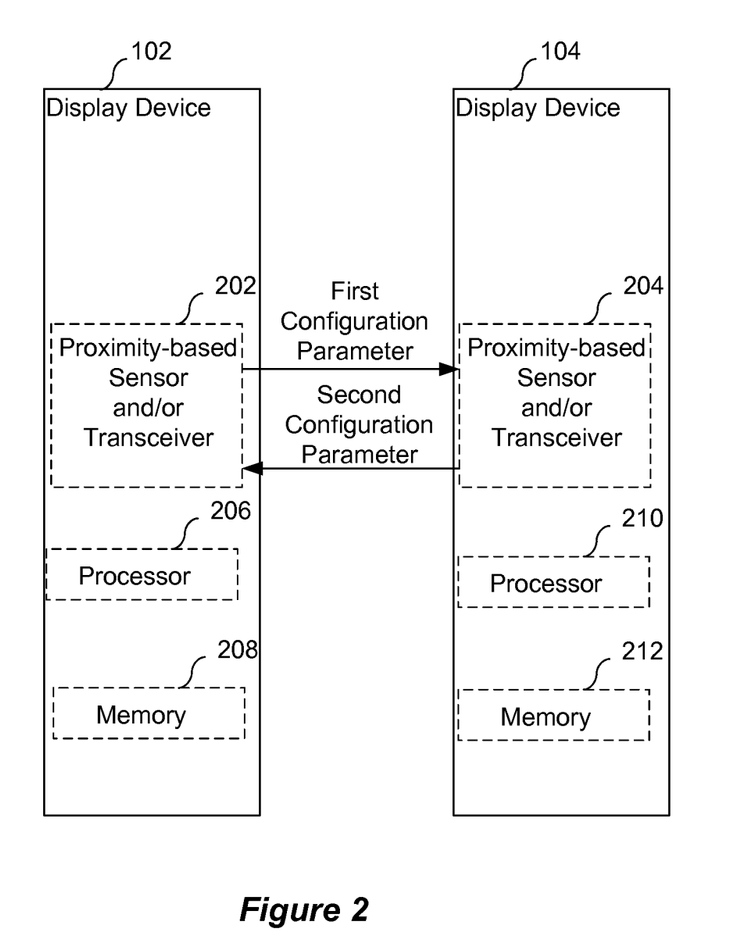
FIG. 2 illustrates the internal components of the first mobile computing device and the second mobile computing device illustrated in FIG. 1.

FIG. 2 illustrates the internal components of the first display device 102 and the second display device 104 illustrated in FIG. 1. The first display device 102 has a first proximity-based sensor and/or transceiver 202. Further, the second display device 104 has a second proximity-based sensor and/or transceiver 204. Examples of a proximity-based sensor and/or transceiver include RFID chip, RFID tag, Near Field Communication ("NFC") chip, NFC tag, Bluetooth, or the like The proximity-based sensor and/or transceivers 202 and 204 may establish radio or other communication with each other based upon one or more standards, e.g., NFC standards.

In one aspect, the first display device 102 determines the presence of the second display device 104. For example, the first proximity-based sensor and/or transceiver 202 may detect the presence of the second proximity-based sensor and/or transceiver 204 within a proximity. Upon detection of the second proximity-based sensor and/or transceiver 204, the first display device 102 determines its position relative to the second display device 104. The first display device 102 then sends a configuration parameter to the second display device 104. In one aspect, the configuration parameter is the relative position of the first display device 102 to the second display device 104. For example, the configuration parameter may state that the first display device 102 is on the left side. In another aspect, the configuration parameter may be screen dimensions, a screen resolution, or dots per inches ("dpi"). In yet another aspect, the configuration parameter may include the relative position, screen dimensions, screen resolution, and/or dpi.

Upon detection of the first proximity-based sensor and/or transceiver 202, the second display device 104 determines its position relative to the first display device 102. The second display device 104 then sends a configuration parameter to the first display device 102. In one aspect, the configuration parameter is the relative position of the second display device 104 to the first display device 102. For example, the configuration parameter may state that the second display device 104 is on the right side.

As a result, each of display devices 102 and 104 is aware of its own position and/or the relative position of the other display device 102 or 104 as received from the other display device 102 or 104. Accordingly, each display device 102 or 104 is aware of the portion of the video content to display, e.g., the display device 102 is aware that it should display the left half portion of the video content, whereas the display device 104 is aware that it should display the right half portion of the video content.

In one aspect, the proximity is predefined. In other words, a predefined distance may be established for which the display devices 102 and 104 have to be with respect to each other in order to establish communication. For example, the predefined distance may be established such that a tap of the display devices 102 and 104 establishes communication. Alternatively, the predefined distance may be a distance that does not have a tap.

In one aspect, the first display device 102 also has a processor 206 and a memory 208. The processor 206 may be utilized to determine the manner in which an image is displayed by the first display device 102. Further, the second display device 104 also has a processor 210 and a memory 212. The processor 210 may be utilized to determine the manner in which an image is displayed by the second display device 104.

Figure 3:
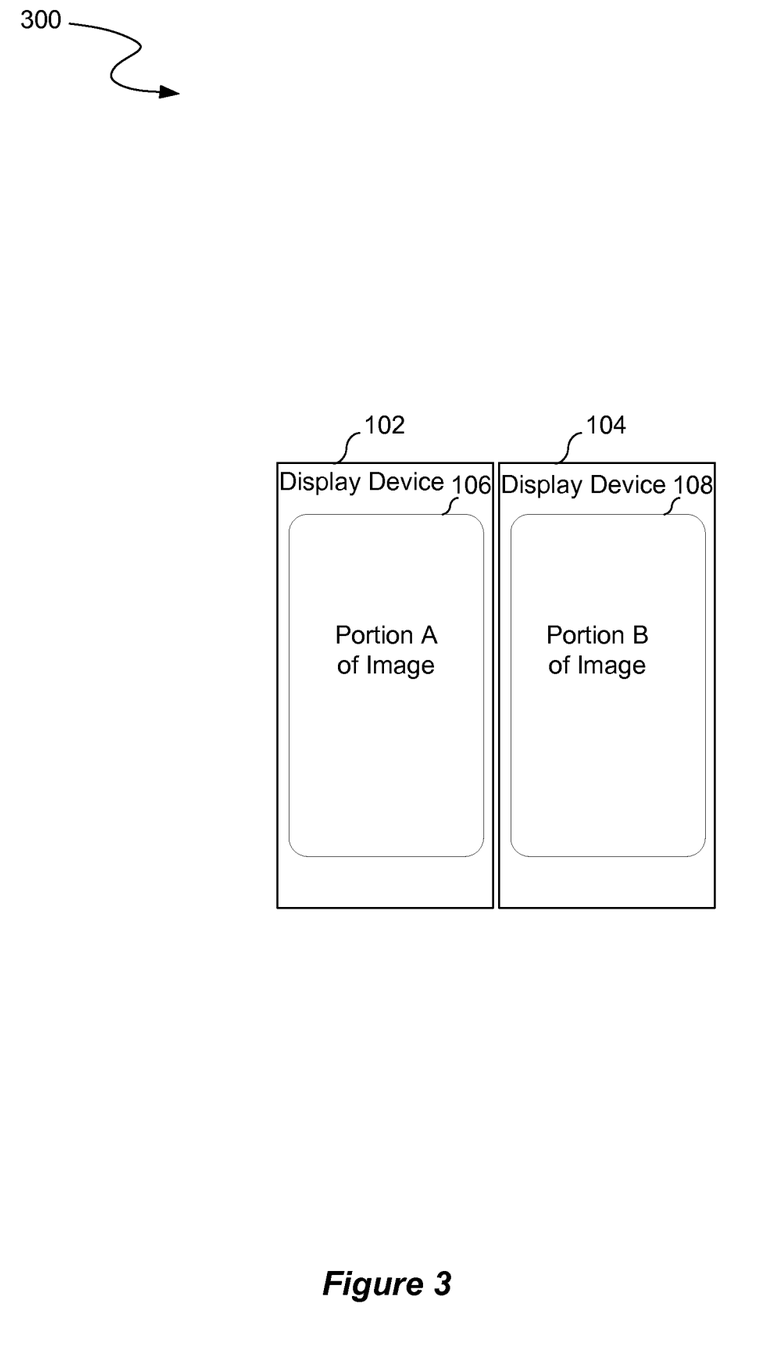
FIG. 3 illustrates the display devices illustrated in FIGS. 1 and 2 being placed next to each other to display a multi-display configuration.

FIG. 3 illustrates the display devices 102 and 104 illustrated in FIGS. 1 and 2 being placed next to each other to display a multi-display configuration 300. The first display device 102 displays a left portion A. Further, the second display device 104 displays a right portion B. Accordingly, users can place their display devices 102 and 104 together to display video content. By placing their display devices together, the users are able to watch a much larger display of the video content than with the displays 106 and 108 illustrated in FIG. 1 of their individual display devices 102 and 104.

In one aspect, the display devices 102 and 104 are wireless devices. In another aspect, the display devices are connected through a wireline connection.

Figure 4:
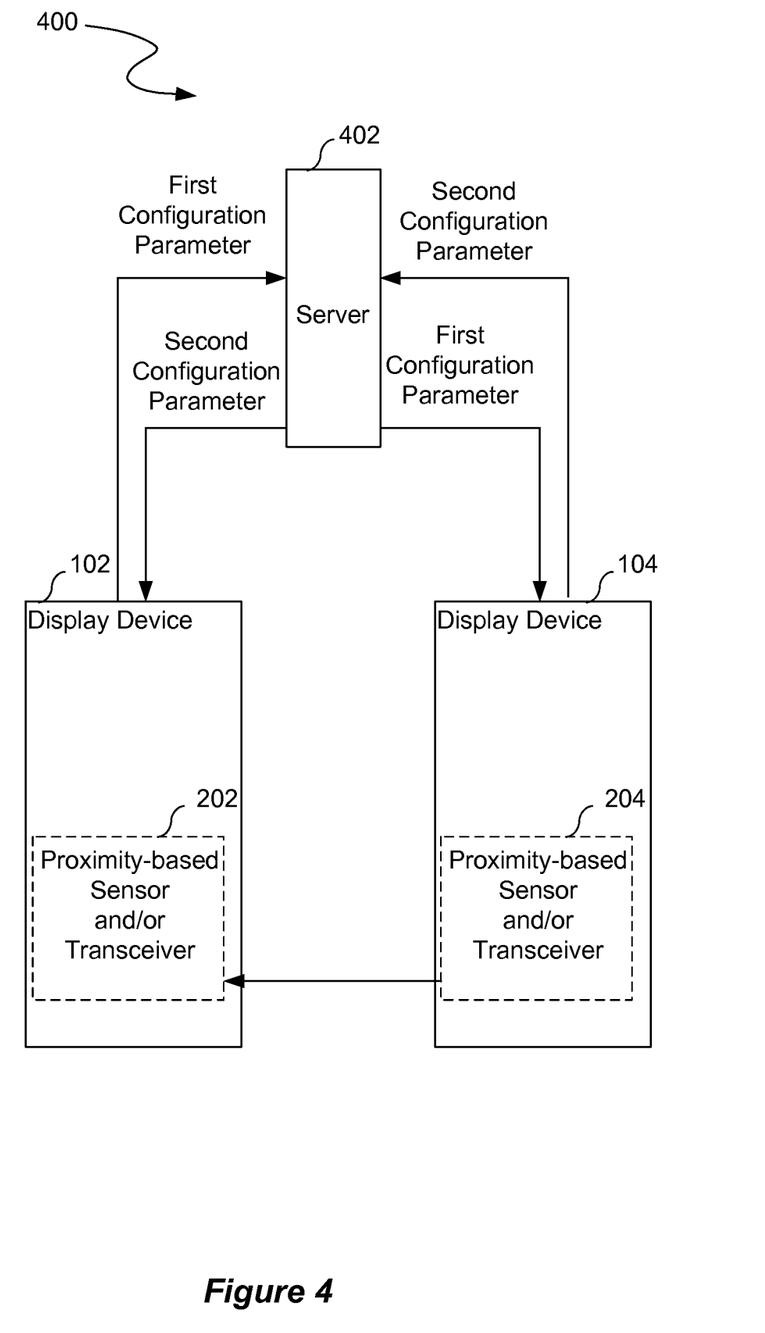
FIG. 4 illustrates a multi-display configuration in which a server is utilized to provide configuration parameters between the first display device and the second display device.

FIG. 4 illustrates a multi-display configuration 400 in which a server 402 is utilized to provide configuration parameters between the first display device 102 and the second display device 104. Rather than the display devices 102 and 104 providing configuration parameters between each other, the display devices 102 and 104 send and receive configuration parameters to and from the server 402. For example, the first display device 102 sends a configuration parameter, e.g., the position of the first display device 102 with respect to the second display device 104, to the server 104. The server 402 then sends that configuration parameter to the second display device 104. As another example, the second display device 104 sends a configuration parameter, e.g., the position of the second display device 104 with respect to the first display device 102, to the server 104. The server 104 then sends that configuration parameter to the first display device 102.

In one aspect, the server 402 provides the various configuration parameters to and from each of the display devices 102 and 104. In other words, the server 402 retransmits all device configurations to the display devices 102 and 104. The display devices 102 and 104 then determine which respective portions of the image to display based upon the configuration parameters.

In another aspect, the server 402 determines the multi-display configuration 400. In other words, the server 402 determines the portion of the image that is displayed on each of the devices 102 and 104. For example, the server 402 may inform the first display device 102 that the left portion of the image should be displayed by the first display device 102, whereas the server 402 may inform the second display device 104 that the right portion of the image should be displayed by the second display device 104. The server 402 may provide the respective portions of the image to the display devices 102 and 104 or inform the display devices 102 and 104 which portions of the overall image should be displayed.

In one aspect, the display devices 102 and 104 receive the entire content display but only display the corresponding portion of the multi-display configuration. In another aspect, the display devices 102 and 104 only receive the corresponding portions of the content for the multi-display configuration. For example, the server 402 may send the left half of the content to the display device 102 and the right half of the content to the display device 104.

Figure 5:
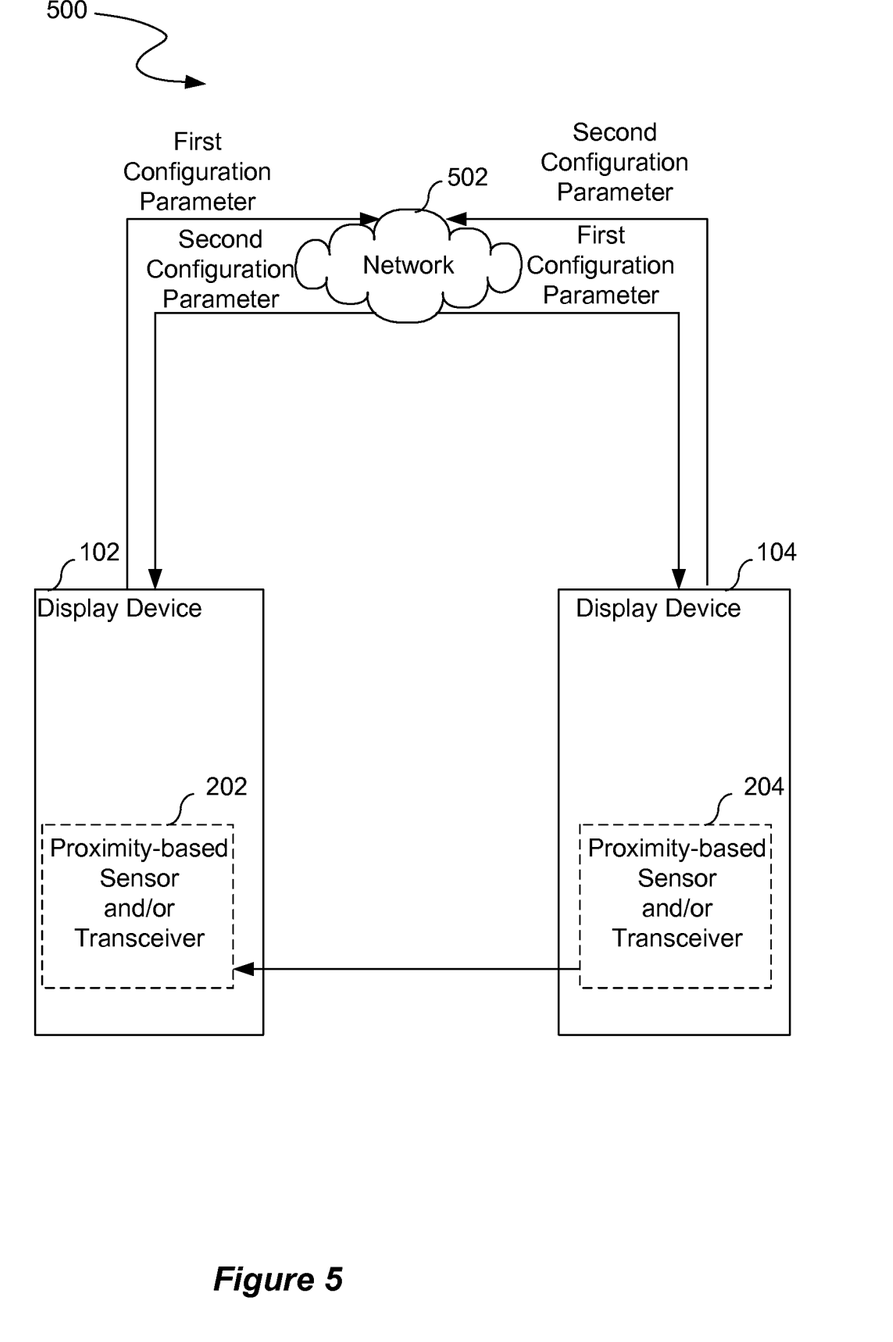
FIG. 5 illustrates a multi-display configuration in which a network is utilized to provide configuration parameters between the first display device and the second display device.

FIG. 5 illustrates a multi-display configuration 500 in which a network 502 is utilized to provide configuration parameters between the first display device 102 and the second display device 104. Rather than the display devices 102 and 104 providing configuration parameters between each other, the display devices 102 and 104 send and receive configuration parameters to and from the network 502. For example, the first display device 102 sends a configuration parameter, e.g., the position of the first display device 102 with respect to the second display device 104, to the network 502. The network 502 then sends that configuration parameter to the second display device 104. As another example, the second display device 104 sends a configuration parameter, e.g., the position of the second display device 104 with respect to the first display device 102, to the network 502. The network 502 then sends that configuration parameter to the first display device 102.

In one aspect, the network 502 allows the first display device 102 and the second display device 104 to broadcast their respective configurations parameters. Each of the display devices 102 and 104 broadcasts its particular configuration parameter to the network 502. Each of the display devices 102 and 104 listens to the network 502 for configuration parameters and updates from the other display device 102 or 104.

Figure 6:
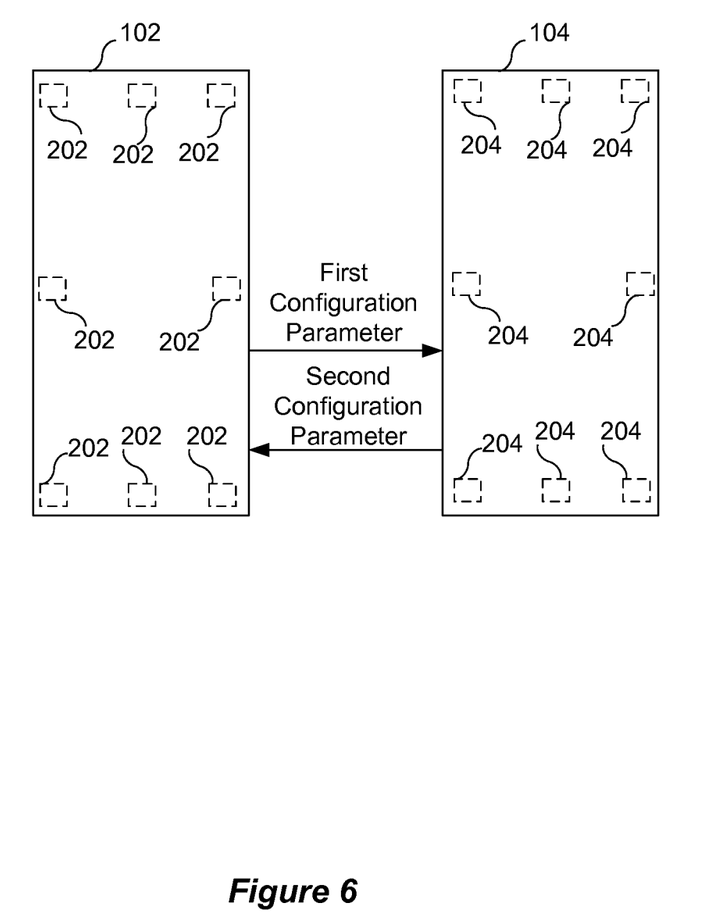
FIG. 6 illustrates the internal components of the display devices illustrated in FIG. 2 having proximity-based sensors and/or transceivers located along the sides and corners of the display devices.

In an alternative configuration from the internal components of the first display device 102 and the second display device 104 illustrated in FIG. 2, a variety of quantities (two or more) of proximity-based sensors and/or transceivers 202 and 204 may be utilized. FIG. 6 illustrates the internal components of the first display device 102 illustrated in FIG. 2 having proximity-based sensors and/or transceivers 202 located along the sides and corners of the display device 102. Further, FIG. 6 illustrates the internal components of the second display device 104 illustrated in FIG. 2 having proximity-based sensors and/or transceivers 204 located along the sides and corners of the second display device 104.

A subset or all of the proximity-based sensors and/or transceivers 202 may be utilized to assess the relative position of the first display device 102 with respect to the second display device 104. For example, a subset or all of the proximity-based sensors and/or transceivers 202 may determine that the first display device 102 is to the left of the second display device 104 by calculating the signal intensity (signal strength) of communications with a subset or all of the proximity-based sensors and/or transceivers 204. Factors in addition to or in place of signal intensity may alternatively be utilized. Although the sides and corners are illustrated in FIG. 6 as positions for the proximity-based sensors and/or transceivers 202 and 204, various other positions within the display devices 102 and 104 may alternatively be utilized.

In an alternative configuration, the relative position of the display devices 102 and 104 is determined through location trackers. For example, the first display device 102 may have a first GPS device, whereas the second display device 104 may have a second GPS device. The first GPS device may provide the first display device 102 with location coordinates in a real world coordinate system, whereas the second GPS device may provide the second display device 104 with location coordinates in the real world coordinate system. Each display device 102 and 104 may then send each other their respective real world coordinates.

Figure 7:
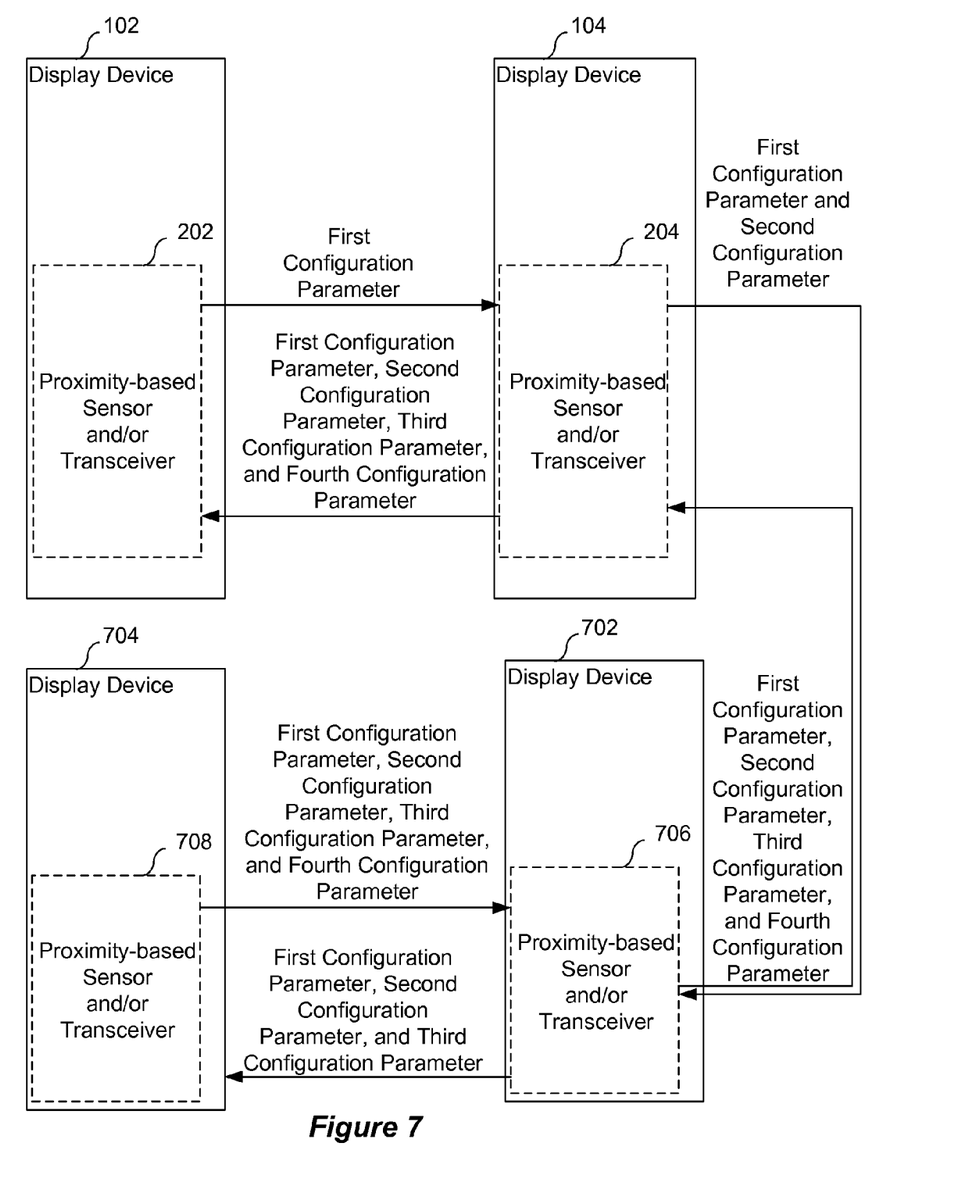
FIG. 7 illustrates an example of the internal components of the first display device, the second display device, a third display device, and a fourth display device.

Although the examples illustrated in FIGS. 1-6 utilize two display devices 102 and 104, more than two display devices may be utilized. For example, four campers may be on a camping trip and want to have a large video display with their four smartphones. FIG. 7 illustrates an example of the internal components of the first display device 102, the second display device 104, a third display device 702, and a fourth display device 704. In one aspect, the display devices 102, 104, 702, and 704 communicate configuration parameters, e.g., their relative positions, through a daisy chain configuration. For example, the proximity-based sensor and/or transceiver 202 in the first display device 102 sends a first configuration parameter to the proximity-based sensor and/or transceiver 204 in the second display device 104. The proximity-based sensor and/or transceiver 204 in the second display device 104 may then send the first configuration parameter along with the second configuration parameter to a proximity-based sensor and/or transceiver 706 in the third display device 702. Further, the proximity-based sensor and/or transceiver 706 in the third display device 702 may then send the first configuration parameter, the second configuration parameter, and the third configuration parameter to a proximity-based sensor and/or transceiver 708 in the fourth display device 704 The fourth display device 704 may then send the first configuration parameter, the second configuration parameter, the third configuration parameter, and the fourth configuration parameter to the third display device 702. The third display device 702 may then send those configuration parameters to the second display device 104. The second display device 104 may then send those configuration parameters to the first display device 102.

As a result, each of the display devices 102, 104, 702, and 704 receives the configuration parameters of the other display devices 102, 104, 702, and 704. Accordingly, the respective display devices 102, 104, 702, and 704 know which portion of the image to display. Although a daisy chain configuration is illustrated in FIG. 7, various other configurations may be utilized for more than two display devices, e.g., a server based system as illustrated in FIG. 4, a network based system as illustrated in FIG. 5, or the like.

In one aspect, discovery of display devices 102, 104, 702, and 704 is performed with a proximity-based configuration such as NFC. For example, a communication protocol may provide that the top side denoted as side one, the right side is denoted as side two, the bottom side is denoted as side three, and the left side is denoted as side four. Further, the display device 102 may be denoted as A, the display device 104 may be denoted as B, the display device 702 may be denoted as C, and the display device 704 may be denoted as D. Display device A and display device B negotiate and make each other aware, i.e., their respective configurations are broadcasted. For example, display device A may broadcast a message of [0, B4, 0, 0] to display device B. Each position in the message corresponds to the first, second, third, or fourth position, e.g., the first position may correspond to the top side, the second position may correspond to the right side, the third position may correspond to the bottom side, and the fourth position may correspond to the left side. Accordingly, the display device A is stating that its configuration is such that there is no relative position to display device B for the first, third, and fourth positions, but has the second position, e.g., the right position, adjacent to B4, i.e., the left position of the display device B. In other words, display device A is stating that its right side is next to the left side of display device B. Further, display device B may broadcast a message of [0, 0, 0, A2] to display device A. The display device B is stating that its configuration is such that there is no relative position to display device A for the first, second, and third positions, but has the fourth position, e.g., the left position, adjacent to A2, i.e., the right position of the display device A. In other words, display device B is stating that its left side is next to the right side of display device A.

As a result, the display device A is aware that it should display the left half of the image whereas the display device B is aware that it should display the right half of the image. The resulting multi-display configuration 300 is illustrated in FIG. 3. Accordingly, display devices may self discover and become aware of the immediate network of display devices.

The communication protocol may also be utilized with more than two display devices as illustrated in FIG. 7. For example, display device A may broadcast [0, B4, D1, 0] to the other display devices, display device B may broadcast [0, 0, C1, A2], display device C may broadcast [B3, 0, 0, D2] to the other display devices, and display device D may broadcast [A3, C4, 0, 0] to the other display devices. As a result, the display devices 102, 104, 702, and 704 would display respective portions of an image according to the positions illustrated in FIG. 7.

In another aspect, an additional message may be composed by each display device 102, 104, 702, and 704. The additional message may comprise the entire architecture. For example, each display device 102, 104, 702, and 704 may additionally broadcast the following message: [A: 0, B4, D1, 0] [B: 0, 0, C1, A2] [C: B3, 0, 0, D2] [D: A3, C4, 0, 0]. This additional message helps provide for efficient multi-display configuration assembly with another multi-display configuration. For example, the message [A: 0, B4, D1, 0] [B: 0, 0, C1, A2] [C: B3, 0, 0, D2] [D: A3, C4, 0, 0] has already been composed to describe the multi-display configuration that results from the arrangement of the display devices 102, 104, 702, and 704 illustrated in FIG. 7. If additional users provide additional display devices to provide yet a larger display than that which results from the four display devices 102, 104, 702, and 704, the new multi-display configuration may utilize the message [A: 0, B4, D1, 0] [B: 0, 0, C1, A2] [C: B3, 0, 0, D2] [D: A3, C4, 0, 0] in combination with another message to form the new multi-display configuration.

The communication protocol format described herein is intended only as an example. Various other types of messaging formats may be utilized for the communication protocol.

Figure 8:
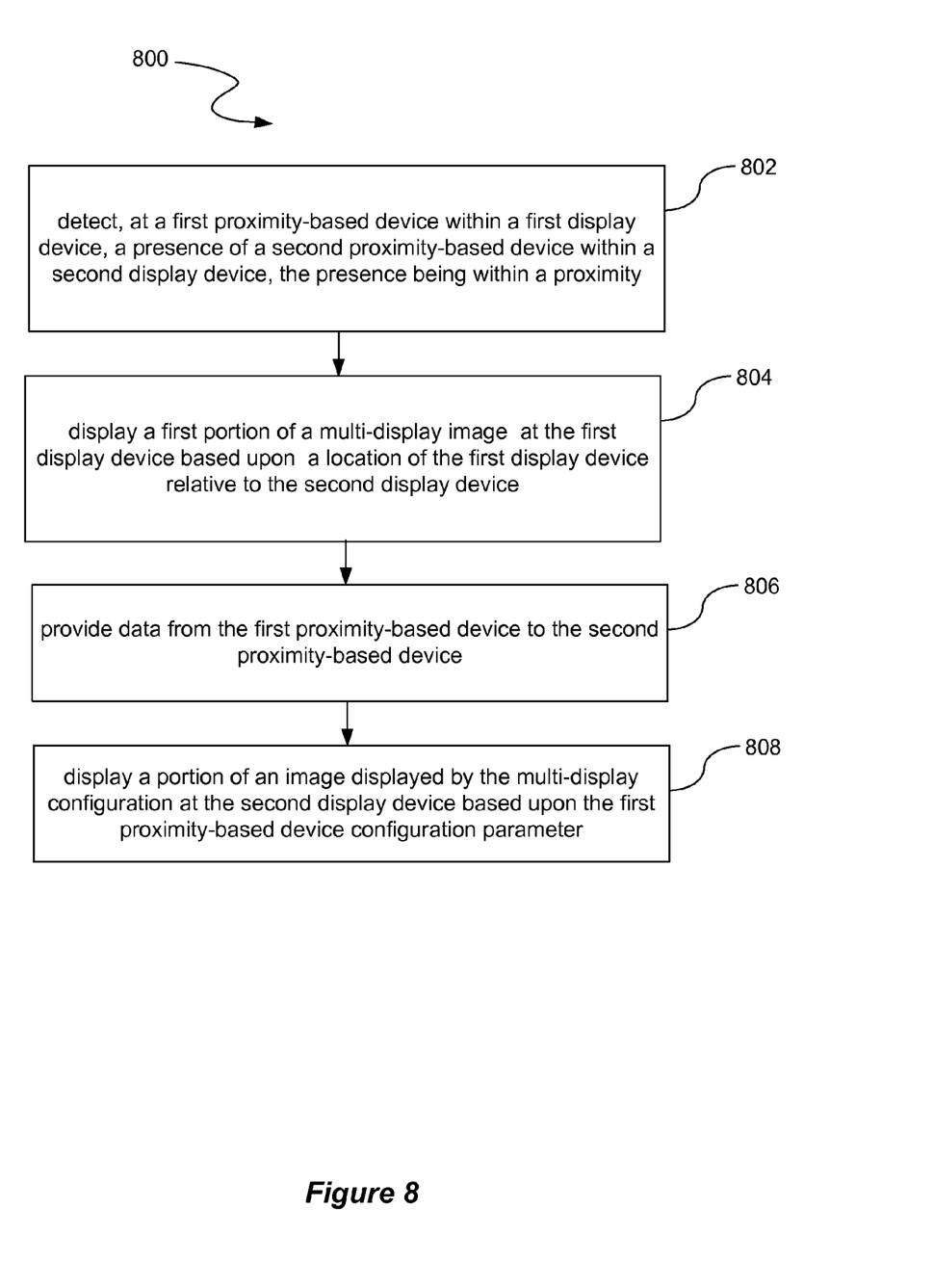
FIG. 8 illustrates a process that may be utilized to provide a multi-display configuration.

FIG. 8 illustrates a process 800 that may be utilized to provide a multi-display configuration. At a process block 802, the process 800 detects, at a first proximity-based device within a first display device, a presence of a second proximity-based device within a second display device. The presence is within a proximity. Further, at a process block 804, the process 800 displays a first portion of a multi-display image at the first display device based upon a location of the first display device relative to the second display device.

Further, at a process block 806, the process 800 provides data from the first proximity-based device to the second proximity-based device. The data includes a first proximity-based device configuration parameter within a multi-display configuration. In addition, at a process block 808, the process 800 displays a portion of an image displayed by the multi-display configuration at the second display device based upon the first proximity-based device configuration parameter.

Figure 9:
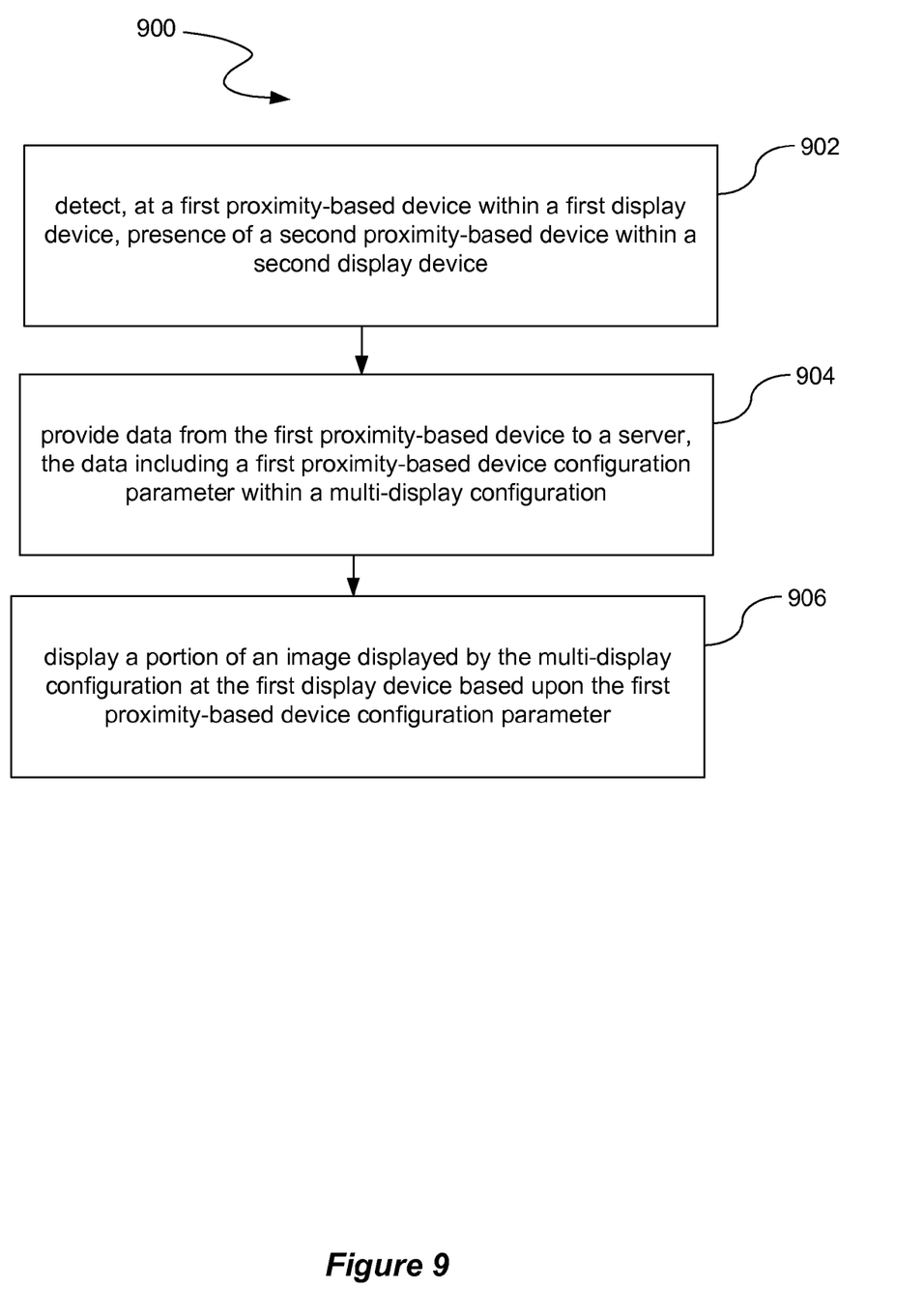
FIG. 9 illustrates an alternative process that may be utilized to provide a multi-display configuration.

Further, FIG. 9 illustrates an alternative process 900 that may be utilized to provide a multi-display configuration. At a process block 902, the process 900 detects, at a first proximity-based device within a first display device, presence of a second proximity-based device within a second display device, the presence being within a proximity. Further, at a process block 904, the process 900 provides data from the first proximity-based device to a server. The data includes a first proximity-based device configuration parameter within a multi-display configuration. At a process block 906, the process 900 displays a portion of an image displayed by the multi-display configuration at the first display device based upon the first proximity-based device configuration parameter. In another aspect, the process 900 receives a second proximity-based device configuration parameter within the multi-display configuration from the server. The first proximity-based device configuration parameter is distinct from the second proximity-based device configuration parameter.

Figure 10:
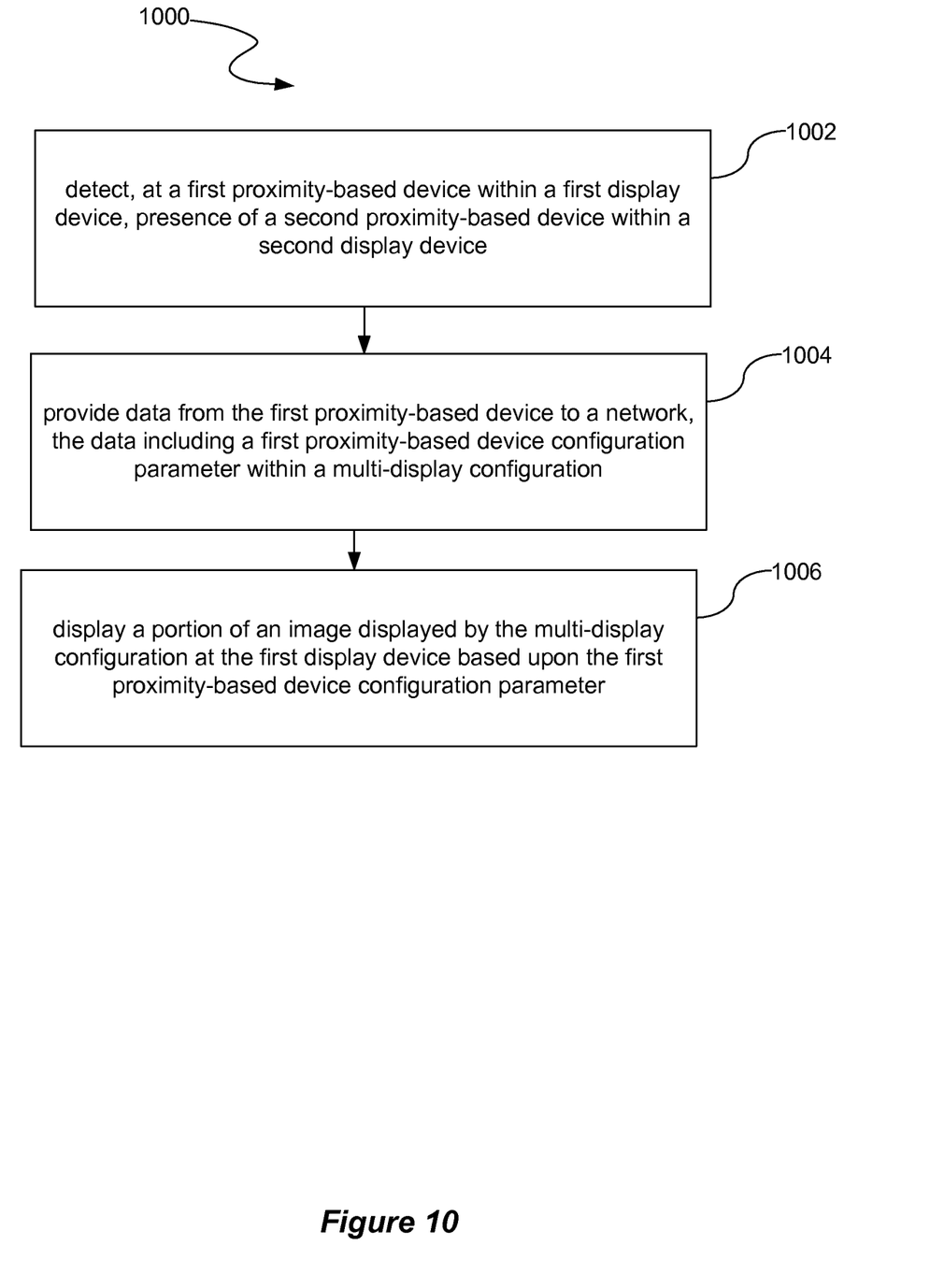
FIG. 10 illustrates yet another alternative process that may be utilized to provide a multi-display configuration.

In addition, FIG. 10 illustrates yet another alternative process 1000 that may be utilized to provide a multi-display configuration. At a process block 1002, the process 1000 detects, at a first proximity-based device within a first display device, presence of a second proximity-based device within a second display device. The presence is within a proximity. Further, at a process block 1004, the process 1000 provides data from the first proximity-based device to a network. At a process block 1006, the process 1000 displays a portion of an image displayed by the multi-display configuration at the first display device based upon the first proximity-based device configuration parameter.

The processes described herein may be implemented in a general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network.

Although a variety of display devices have been illustrated as having similar dimensions, display devices with different dimensions may be utilized. Images may be processed to accommodate different display screen dimensions, different screen resolutions, different dpi, and the like based upon relative positioning of the display devices 102, 104, 702, and 704. For example, two smartphones and two tablet devices may be utilized to form a larger image. Accordingly, a display configuration parameter may be sent according to any of the communication protocols described herein that includes data such as the dimensions of a respective display screen. For example, the four display devices 102, 104, 702, and 704 may be different dimensions. As a result, each display device 102, 104, 702, and 704 would not display one fourth of an image. Each display device 102, 104, 702, and 704 would display a portion based upon the relative screen size in the multi-display configuration. For example, the display devices 102 and 104 may each have a screen size that is one eighth of the overall screen size of the multi-display configuration whereas the display devices 702 and 704 may each have a screen size that is three eighths of the overall screen size of the multi-display configuration. Accordingly, the display devices 102 and 104 each display one eighth of the image whereas the display devices 702 and 704 each display three eighths of the image. In one aspect, the display screen dimensions of other display devices 102, 104, 702, and/or 704 are received as part of the configuration parameter so that a particular display device 102, 104, 702, and/or 704 may determine the respective portion of the image to be displayed based upon the dimensions of the overall multi-display configuration. In another aspect, the server 402 illustrated in FIG. 4 determines the size of the overall multi-display configuration and provides the portions to each of the display devices 102, 104, 702, and 704 for display or informs each of the display devices 102, 104, 702, and 704 which portions to display.

Figure 11:
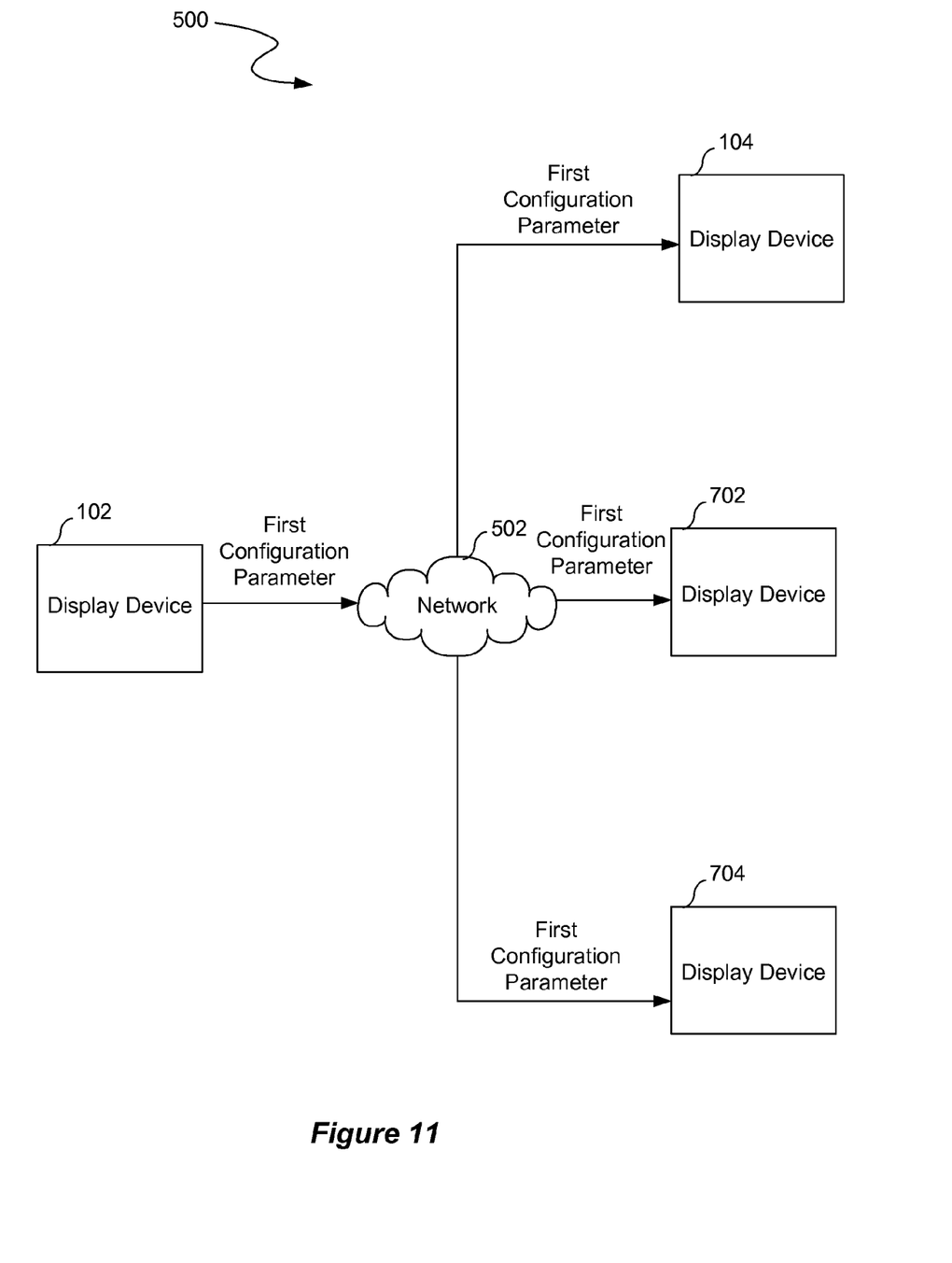
FIG. 11 illustrates the multi-display illustrated in FIG. 5 in which more than two display devices are utilized.

Further, the broadcast configurations described herein may be utilized for more than two display devices. FIG. 11 illustrates the multi-display 500 illustrated in FIG. 5 in which more than two display devices are utilized. The display device 102 provides the first configuration parameter through the network 502, e.g., broadcasts the first configuration parameter, to the second display device 104, the third display device 702, and the fourth display device 704. Further, each of the display devices 104, 702, and 704 may broadcast their own respective configuration parameters to the remaining display devices 102, 104, 702, and/or 704 through the network 502.

In another aspect, alternative configurations may be recommended by the server 402 illustrated in FIG. 4 or the display devices 102, 104, 702, and/or 704 illustrated in FIG. 7 themselves. For example, users may position the display devices 102, 104, 702, and/or 704 in a particular manner such that the first display device 102 is in the upper left position, the second display device 104 is in the upper right position, the third display device 702 is in the lower right position, and the fourth display device 704 is in the lower left position. After such positioning, the server 402 or the display devices 102, 104, 702, and/or 704 themselves may each determine that an alternative multi-display configuration would provide a better viewing experience based upon display screen dimensions, display screen resolutions, dpi, and/or the like. Accordingly, the server 402 or the display devices 102, 104, 702, and/or 704 may each recommend that the users adjust the multi-display configuration to the first display device 102 being in the upper left position, the second display device 104 being in the upper right position, the third display device 704 being in the lower right position, and the fourth display device 702 being in the lower left position.

In the embodiments described herein, a server can determine how an image is split among different display devices. Alternatively, one of the display devices can determine how an image is split among different display devices. A whole image or video may be stored at each display device. Alternatively, a server only transmits a portion of the image or video to each display device.

It is understood that the apparatuses, systems, computer program products, and processes described herein may also be applied in other types of apparatuses, systems, computer program products, and processes. Those skilled in the art will appreciate that the various adaptations and modifications of the aspects of the apparatuses, systems, computer program products, and processes described herein may be configured without departing from the scope and spirit of the present apparatuses, systems, computer program products, and processes. Therefore, it is to be understood that, within the scope of the appended claims, the present apparatuses, systems, computer program products, and processes may be practiced other than as specifically described herein.

We claim:

1. A method comprising:
   detecting, at a first proximity-based device within a first display device, a presence of a second proximity-based device within a second display device, the presence being within a proximity;
   determining, at the first display device, a configuration parameter of the second proximity-based device, the configuration parameter indicating a user selected location of the second display device relative to the first display device;
   determining, at the first display device, an alternative location of the second display device relative to the first display device that provides a more optimal user experience than the user selected location, a first portion of a multi-display image to be displayed by the first display device, and a second portion of the multi-display image to be displayed by the second display device based upon the alternative location of the second display device relative to the first display device;
   sending, from the first display device to the second display device, the second portion of the multi-display image so that the second display device displays the second portion of the multi-display image; and
   displaying the first portion of the multi-display image at the first display device.

2. The method of claim 1, further comprising receiving, at the first display device from the second display device, the configuration parameter.

3. The method of claim 2, wherein the configuration parameter comprises dimensions for a display screen of the second display device.

4. The method of claim 3, wherein the first portion of the multi-display image is determined based upon dimensions for a display screen of the first display device and the second portion of the multi-display image is determined based upon the dimensions for the display screen of the second display device, the dimensions for the display screen of the first display device being distinct from the dimensions for the display screen of the second display device.

5. The method of claim 2, wherein the configuration parameter comprises a screen resolution for a display screen of the second display device.

6. The method of claim 5, wherein the first portion of the multi-display image is determined based upon a screen resolution for a display screen of the first display device and the second portion of the multi-display image is determined based upon the screen resolution for the display screen of the second display device, the screen resolution for the display screen of the first display device being distinct from the screen resolution for the display screen of the second display device.

7. An apparatus comprising:
   a first proximity-based device; and
   a first display device in operable communication with the first proximity-based device that determines a configuration parameter of a second proximity-based device within a second display device that indicates a user selected location of the second display device relative to the first display device, determines an alternative location of the second display device relative to the first display device that provides a more optimal user experience than the user selected location for a multi-display image, determines a first portion of the multi-display image to be displayed by the first display device, and a second portion of the multi-display image to be displayed by the second display device based upon the alternative location of the second display device relative to the first display device, and sends the second portion of the multi-display image to the second display device so that the second display device displays the second portion of the multi-display image based upon the alternative location of the second display device relative to the first display device, wherein the first display device is configured to display the first portion of the multi-display image, wherein presence of the second proximity-based device is detected by the first proximity-based device.

8. The apparatus of claim 7, further comprising a receiver that receives, at the first display device from the second display device, the configuration parameter.

9. The apparatus of claim 8, wherein the configuration parameter comprises dimensions for a display screen of the second display device.

10. The apparatus of claim 9, wherein the first portion of the multi-display image is determined based upon dimensions for a display screen of the first display device and the second portion of the multi-display image is determined based upon the dimensions for the display screen of the second display device, the dimensions for the display screen of the first display device being distinct from the dimensions for the display screen of the second display device.

11. The apparatus of claim 8, wherein the configuration parameter comprises a screen resolution for a display screen of the second display device.

12. The apparatus of claim 11, wherein the first portion of the multi-display image is determined based upon a screen resolution for a display screen of the first display device and the second portion of the multi-display image is determined based upon the screen resolution for the display screen of the second display device, the screen resolution for the display screen of the first display device being distinct from the screen resolution for the display screen of the second display device.

13. A method comprising:
   determining, at a server, a first position of a first display device and a second position of a second display device in a multi-display configuration that is user selected, the multi-display configuration displaying a multi-display image;
   determining, at the server, an alternative first position for the first display device in the multi-display configuration that provides a more optimal user experience than the first position; and
   sending, from the server, a recommendation to a user of the multi-display configuration to adjust the first display device from the first position to the alternative first position.

14. The method of claim 13, further comprising determining, at the server, dimensions of a display screen for the first display device and dimensions of a display screen for the second display device.

15. The method of claim 14, further comprising determining, at the server, the first portion of the multi-display image based upon the dimensions of the display screen for the first display device and the second portion of the multi-display image based upon the dimensions of the second display device.

16. The method of claim 14, wherein the dimensions of the display screen for the first display device are distinct from the dimensions of the display screen for the second display device.

* * * * *